US012632933B2

(12) United States Patent
Schnellbächer et al.

(10) Patent No.: US 12,632,933 B2
(45) Date of Patent: May 19, 2026

(54) PERFORMING DENOISING ON AN IMAGE

(71) Applicant: KONINKLIJKE PHILIPS N.V.,
Eindhoven (NL)

(72) Inventors: Nikolas David Schnellbächer, Lübeck
(DE); Christian Wuelker, Hamburg
(DE); Frank Bergner, Hamburg (DE);
Kevin Martin Brown, Chardon, OH
(US); Michael Grass, Buchholz In Der
Nordheide (DE)

(73) Assignee: KONINKLIJKE PHILIPS N.V.,
Eindhoven (NL)

( * ) Notice: Subject to any disclaimer, the term of this
patent is extended or adjusted under 35
U.S.C. 154(b) by 414 days.

(21) Appl. No.: 18/038,580

(22) PCT Filed: Dec. 2, 2021

(86) PCT No.: PCT/EP2021/083994
§ 371 (c)(1),
(2) Date: May 24, 2023

(87) PCT Pub. No.: WO2022/117738
PCT Pub. Date: Jun. 9, 2022

(65) Prior Publication Data
US 2024/0095885 A1 Mar. 21, 2024

Related U.S. Application Data

(60) Provisional application No. 63/121,286, filed on Dec.
4, 2020.

(30) Foreign Application Priority Data

Apr. 19, 2021 (EP) ..................................... 21169134

(51) Int. Cl.
G06T 5/00 (2024.01)
G06T 5/50 (2006.01)
G06T 5/70 (2024.01)

(52) U.S. Cl.
CPC .................. G06T 5/70 (2024.01); G06T 5/50
(2013.01); *G06T 2207/10072* (2013.01); *G06T*
*2207/20084* (2013.01); *G06T 2207/20221*
(2013.01)

(58) Field of Classification Search
CPC ... G06T 5/70; G06T 5/50; G06T 2207/10072;
G06T 2207/20084; G06T 2207/20221
See application file for complete search history.

(56) References Cited

U.S. PATENT DOCUMENTS

| | | | |
|---|---|---|---|
| 8,873,825 B2 | 10/2014 | Mercuriev | |
| 9,569,843 B1 | 2/2017 | Mailhe | |

(Continued)

FOREIGN PATENT DOCUMENTS

| | | |
|---|---|---|
| CN | 111091517 A | 5/2020 |
| JP | 2011199786 A | 10/2011 |

OTHER PUBLICATIONS

PCT International Search Report, International application No.
PCT/EP2021/083994, Mar. 23, 2022.

(Continued)

*Primary Examiner* — Gregory M Desire
(74) *Attorney, Agent, or Firm* — Larry Liberchuk

(57) ABSTRACT

A mechanism for generating a partially denoised image. A
residual noise image, obtained by processing an image using
a convolutional neural network, is weighted. The blending
or combination of the weighted residual noise image and the
(original) image generates the partially denoised image.

14 Claims, 5 Drawing Sheets

(56)     References Cited

U.S. PATENT DOCUMENTS

| | | | | |
|---|---|---|---|---|
| 9,679,223 | B2 | 6/2017 | Moon | |
| 10,269,099 | B2 | 4/2019 | Lee | |
| 10,853,977 | B2 | 12/2020 | Ye | |
| 10,984,564 | B2 | 4/2021 | Bergner | |
| 11,222,406 | B2 * | 1/2022 | Sharma | G06T 5/60 |
| 11,234,666 | B2 * | 2/2022 | Chan | A61B 6/5258 |
| 11,300,645 | B2 * | 4/2022 | Schlemper | G01R 33/5608 |
| 11,415,656 | B2 * | 8/2022 | Shinoda | G06T 5/70 |
| 11,494,878 | B2 | 11/2022 | Takeda | |
| 11,783,451 | B2 * | 10/2023 | Litwiller | G06T 5/60 |
| | | | | 382/275 |
| 11,810,276 | B2 * | 11/2023 | Nett | G06T 5/60 |
| 2006/0256215 | A1 | 11/2006 | Zhang | |
| 2010/0142791 | A1 | 6/2010 | Tsuji | |
| 2011/0268328 | A1 | 11/2011 | Bar-Aviv | |
| 2017/0039685 | A1 | 2/2017 | Goshen | |
| 2017/0132760 | A1 | 5/2017 | Kothule | |
| 2019/0122342 | A1 | 4/2019 | Bergner | |
| 2021/0267577 | A1 | 9/2021 | Trzasko | |

OTHER PUBLICATIONS

Worku J. et al., "Medical Image Denoising Using Convolutional Neural Network: A Residual Learning Approach", The Journal of Supercomputing, Springer US, New York, vol. 75, No. 2, Jun. 2017,pp. 704-718, XP036715215.

Zhong A. et al., "Image Restoration for Low-Dose CT via Transfer Learning and Residual Network", IEEE Access, IEEE, USA, vol. 8, Jun. 13, 2020 (Jun. 13, 2020), pp. 112078-112091, XP011795334.

Wei Y. et al., "Improving Low-Dose CT Image Using Residual Convolutional Network", IEEE Access, [Online] vol. 5, Oct. 16, 2017, pp. 24698-24705, XP055845711. Retrieved from the Internet: URL:https://ieeexplore.ieee.org/ielx7/6287639/7859429/08082505.pdf?tp=&arnumber=8082505&isnumber=7859429&ref=aHR0cHM 6Ly9pZWVVleHBsb3JlLmllZWUub3JnL2Fic3RyYWNOL2RvY3 VtZW5.

Ma Yi. et al., "Low-Dose CT with a Deep Convolutional Neural Network Blocks Model Using Mean Squared Error Loss and Structural Similar Loss", SPIE Proceedings; [Proceedings of SPIE ISSN 0277-786X], SPIE, US, vol. 11209, Dec. 20, 2019, pp. 1120901-1120901, XP060126988.

Zhang K. et al., "Beyond a Gaussian Denoiser: Residual Learning of Deep CNN for Image Denoising", IEEE Transactions on Image Processing, vol. 26, No. 7, pp. 3142-3155, Jul. 2017.

* cited by examiner

410

420

230

500

510

521

520

522

PROCESSING SYSTEM

PERFORMING DENOISING ON AN IMAGE

FIELD OF THE INVENTION

The present disclosure relates to the field of image processing, and in particular to the field of denoising images.

BACKGROUND OF THE INVENTION

There is an increasing use of medical imaging modalities/processes to assess the condition of a patient during a medical procedure, e.g. during a diagnosis procedure or surgical procedure.

However, medical imaging modalities are prone to noise due to the statistical nature of signal formation and data acquisition. These noise sources impair the diagnostic value of medical image data. For this reason, image denoising is not only an inherent part of many general-purpose image processing tools, but is also extremely important in the medical domain to improve the image quality and thus the diagnostic value of acquired medical image data.

One approach to denoising (medical) images is to use a machine-learning method, such as a convolutional neural network, to perform denoising of a (seemingly) noisy image. However, for many real-world medical imaging applications, there is no suitable ground truth data for training a machine-learning method, since there are no fully noise-free images available. Moreover, it has been seen that, when applying machine-learning denoising methods to an image, the output commonly produces a result with a noise level well below the ground truth noise level (e.g. the noise level of an image obtained using a high-quality capture technique). This is an example for a regression-to-mean behavior, commonly occurring when optimizing machine-learning models for image-to-image regression problems using the mean squared error (MSE) as the loss function.

There is therefore an ongoing desire to improve the accuracy of denoising.

SUMMARY OF THE INVENTION

The invention is defined by the claims.

According to examples in accordance with an aspect of the invention, there is provided a computer-implemented method of generating a partially denoised image.

The computer-implemented method comprises: providing an image to an input of a convolutional neural network; processing the image using the convolutional neural network to generate a residual noise image representing the noise content of the image; weighting the values of the residual noise image with one or more predetermined weighting factors to generate a weighted residual noise image; and combining the image and the weighted residual noise image to thereby generate a partially denoised image.

The one or more predetermined weighting factors are determined by selecting one or more weighting factors such that the values of one or more noise characteristics of the partially denoised image are responsive to the values of the same one or more noise characteristics of a portion of a reference image. The portion of the reference image may include the entire reference image, or only a part of the reference image.

The proposed mechanism helps to overcome the regression-to-mean behavior, by only partially denoising an image.

The herein described approach of weighting a residual noise image, before combining the weighted residual noise image with the original image, provides a mechanism for generating a partially denoised image with reduced complexity, processing requirements and memory storage requirements. In particular, using the proposed approach, there is no requirement for generating a fully denoised image when generating the partially denoised image. This invention instead relies upon the use of a residual noise image to modify the (originally obtained) image.

Moreover, the proposed approach makes use of the original image when generating the partially denoised image, thereby mitigating any potential shortcomings of a given original denoising algorithm, by bringing back a guaranteed natural noise texture to the finalized output image. This reduces a potentially over-smoothing or partially degrading effect, which an imperfect algorithm might otherwise have in the denoising stage.

The suggested solution (which makes use of a convolutional neural network) is relatively simple and fast, meaning it can be employed with relatively low computational cost. This is advantageous when compared to other, more elaborate machine-learning approaches, such as generative models or models using perceptual image appearance concepts. Although these approaches may be capable of reaching a desired target noise level, they come at the cost of much higher algorithmic complexity and a significantly increased runtime overhead.

The portion of the reference image effectively acts as a "target" for the noise level of the partially denoised image. This means that the partially denoised image can more closely resemble a "real-life" or higher-quality image, acting as a reference image, without loss of potentially valuable information. Thus, use of a reference image to set the predetermined weighting factor(s) can help reduce or avoid an undesirable regression-to-mean behavior, i.e. over-denoising, during performance of a denoising procedure.

In some examples, the one or more predetermined weighting factors are determined by selecting one or more weighting factors such that the values of one or more noise characteristics of the partially denoised image match the values of the same one or more noise characteristics of a portion of a reference image.

In some examples, the one or more predetermined weighting factors are determined by selecting one or more weighting factors such that the values of one or more noise characteristics of the partially denoised image are proportional to the values of the same one or more noise characteristics of a portion of a reference image. The proportion may be defined by a user input or may be a preset value.

The convolutional neural network may be configured to receive, as input, the image and provide, as output, the residual noise image. That is, the convolutional neural network may directly output the residual noise image. This embodiment improves a simplicity (i.e. reduces processing complexity) of the proposed approach.

The image may comprise a medical image. The medical image may be, for example, a computed tomography (CT) image, a magnetic resonance (MR) image, an X-ray image, an ultrasound (US) image, a positron emission tomography (PET) image, or a single-photon emission computed tomography (SPECT) image.

It is particularly advantageous to use the proposed approach for low-dose computed tomography images (i.e. the image may be a low-dose computed tomography image). This is because such images have a significant amount of noise, and are particularly susceptible to the effect of regression-to-mean behavior.

The image may be two-dimensional or three-dimensional. The image may be one in a sequence of images (e.g. which may form a so-called "4D image"), each of which may be processed according to herein described methods.

The one or more noise characteristics may include one or more of: a signal-to-noise ratio; a contrast-to-noise ratio; a mean; a standard deviation; and an estimated uncertainty map (e.g. produced when generating the residual noise image for the image).

The one or more predetermined weighting factors may be determined by: obtaining the reference image; determining one or more noise characteristics of a portion of the reference image; selecting one or more predetermined weighting factors such that the corresponding noise characteristics of the partially denoised image are responsive to the determined one or more noise characteristics of the portion of the reference image.

In some examples, the step of weighting the values of the residual noise image with one or more predetermined weighting factors comprises weighting the residual noise image with the one or more predetermined weighting factors and one or more further predetermined weighting factors to generate the weighted residual noise image. The one or more further predetermined weighting factors may be determined responsive to a user input. In this way, the weighting factor(s) may be partially tuned (e.g. interactively and continuously) by the user and partially tuned by the portion of the reference image, allowing target noise level control for the partially denoised image.

The user input may comprise a user selection of one or more potential predetermined weighting factors. Thus, there may be a selection of two or more predetermined sets of one or more predetermined weighting factors from which the user can select. This facilitates ease of selecting appropriate predetermined weighting factors for the denoising process.

In some embodiments, each value of the residual noise image represents a noise content of a set of one or more pixels of the image, wherein each value represents a different set of one or pixels; and the one or more predetermined weighting factors comprise a predetermined weighting factor for each value of the residual noise image, which is dependent upon the spatial position of the set of one or more pixels of the image represented by the value of the residual noise image.

Thus, the weighting factor(s) may depend upon spatial information, and in particular upon a spatial position of part of the image with which a value of the residual noise image is associated (e.g. describes the noise content of that part of the image). This means that the amount of denoising performed on different parts, areas or volumes of the image can differ, thereby allowing greater control over the noise characteristics of the partially denoised image.

In some examples, the one or more predetermined weighting factors are dependent upon the time or relative time at which the image was captured and/or a position of the image within a sequence of images.

Thus, the weighting factor(s) may depend upon temporal information, and in particular to a time or relative time at which the image was captured and/or a position of the image within a sequence of image. The relative time may, for example, be a time since the first image in the sequence was captured or a time since an immediately previous image in the sequence was captured. Thus, different images within a sequence of images (such as frames of a video/(cine)loop) may have different sets of one or more predetermined weighting values. This can allow each frame of a video/

(cine)loop to be treated independently, to improve the partial denoising of the overall video/(cine)loop.

The method may further comprise displaying, at a user interface, at least the partially denoised image. The method may further comprise displaying other images and/or values, such as the (originally obtained) image.

In some examples, the step of combining the image and the weighted residual noise image further comprises weighting the image using a second set of one or more predetermined weighting factors, and combining the weighted image and the weighted residual noise image. The second set of one or more predetermined weighted factors may be independent of the one or more predetermined weighted factors (used to weight the residual noise image) or may be derived therefrom.

There is also proposed a computer program product comprising instructions which, when executed by a suitable computer or processing system, cause the computer to carry out any herein described method.

There is also proposed a processing system for generating a partially denoised image.

The processing system is adapted to: provide an image to an input of a convolutional neural network; process the image using the convolutional neural network to generate a residual noise image representing the noise content of the image; weight the values of the residual noise image with one or more predetermined weighting factors to generate a weighted residual noise image; and combine the image and the weighted residual noise image to thereby generate a partially denoised image. The one or more predetermined weighting factors are determined by selecting (235) one or more weighting factors such that the values of one or more noise characteristics of the partially denoised image are responsive to the values of the same one or more noise characteristics of a portion of a reference image The image may comprise a medical image, such as a computed tomography image (CT), a magnetic resonance (MR) image, an X-ray image, an ultrasound (US) image, a positron emission tomography (PET) image, or a single-photon emission computed tomography (SPECT) image.

In some examples, the processing system is configured to weight the values of the residual noise image with one or more predetermined weighting factors by performing a process comprising weighting the residual noise image with the one or more predetermined weighting factors and one or more further predetermined weighting factors to generate the weighted residual noise image; and the one or more further predetermined weighting factors are determined responsive to a user input.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
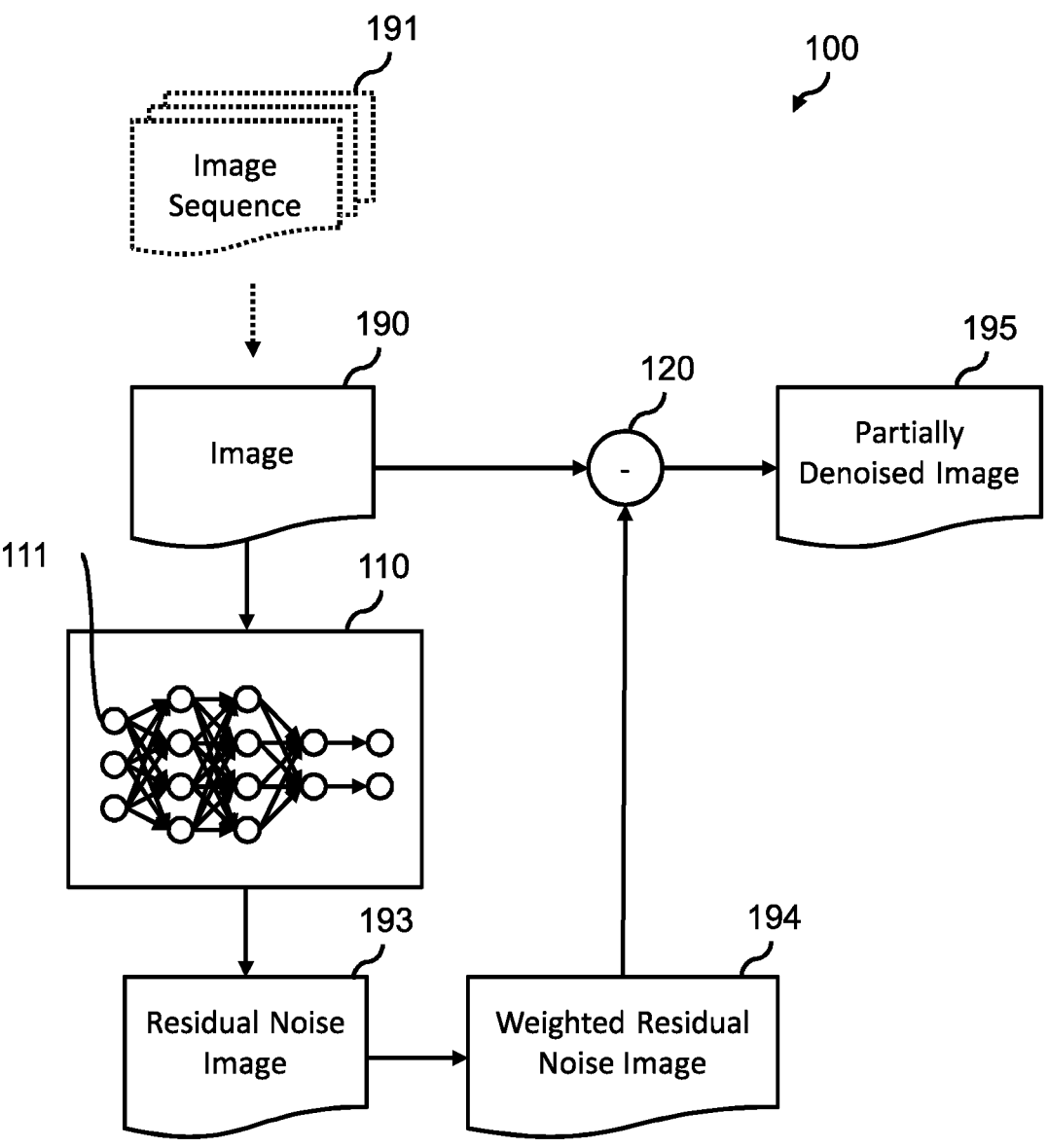
FIG. 1 illustrates a workflow process for understanding a concept of the disclosure.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings.

It should be understood that the Figures are merely schematic and are not drawn to scale. It should also be understood that the same reference numerals are used throughout the Figures to indicate the same or similar parts.

The invention provides a mechanism for generating a partially denoised image. A residual noise image, obtained by processing an image using a convolutional neural network, is weighted. The blending or combination of the weighted residual noise image and the (original) image generates the partially denoised image. The blending process may include a step of weighting the original image before combining the weighed residual noise image and the weighted (original) image.

Embodiments may be employed in any suitable image denoising environment, but are particularly advantageous when employed to denoise medical images.

Generally, the present disclosure provides a mechanism for generating a partially denoised image. An image and a weighted noise residuum (or residual noise image) of the image are blended together to produce a final output.

FIG. 1 is a schematic drawing illustrating a workflow process 100 applied to an image 190 to generate a partially denoised image 195. The image 190 may be two-dimensional or three-dimensional, and comprises a plurality of pixels. The image 190 is occasionally referred to in this disclosure as the "original image".

For the sake of conciseness, the present disclosure uses the generic term "pixel" to refer to both pixels (of a 2D image) and voxels (of a 3D image). Each pixel of an image comprises one or more values, e.g. representing one or more channels of the image (e.g. each representing a particular color, such as in the RGB protocol). In some examples, each pixel has only a single value (e.g. representing light intensity alone).

The image may comprise a medical image. Suitable examples of a medical image include a computed tomography (CT) image, a magnetic resonance (MR) image, an X-ray image, an ultrasound (US) image, a positron emission tomography (PET) image, or a single-photon emission computed tomography (SPECT) image.

The image is processed, during a process 110, using a convolutional neural network 111. The convolutional neural network 111 processes the (values of the) image 190 to generate a residual noise image 193 representing the noise content of the image. Processes for generating a residual noise image (sometimes called a "noise residuum") using a convolutional neural network would be readily apparent to the skilled person.

One suitable approach for generating a residual noise image is disclosed by Zhang, K., Zuo, W., Chen, Y., Meng, D. and Zhang, L., 2017. Beyond a gaussian denoiser:

Residual learning of deep cnn for image denoising. IEEE Transactions on Image Processing, 26(7), pp. 3142-3155. Other approaches would be known to the skilled person.

Each value of the residual noise image may be associated with a "pixel" of the residual noise image, and can therefore be associated with a particular x and y (and optionally z, for 3D images) position within the overall residual noise image.

In some examples, each value of the residual noise image represents a predicted noise level of a (value of a) respective, different pixel of the image 190. In other examples, values of the residual noise image represent the predicted noise level of (values of) different groups of pixels (e.g. representing an area or a volume) of the image 190. Put generally, each value of the residual noise image may represent a noise content of a set of one or more pixels of the image, wherein each value represents a different set of one or pixels.

For a multi-channel image 190, each value of the residual noise image may represent the predicted noise level of a different pixel or different group of pixels, of the image 190, across one or more channels.

In a first example, different sets of values of the residual image may represent the predicted noise level of a different pixel or different group of pixels, of the image 190, for different channels of the image 190. In a second example, different sets of values of the residual image may represent the predicted noise level of a different pixel or different group of pixels, of the image 190, for different sets of two or more channels of the image 190. In a third example, each value of the residual image represents the predicted noise level of a different pixel or different group of pixels, of the image 190 across all channels of the image 190.

Thus, processing a multi-channel image 190 using the convolutional neural network 111 may produce a multi-channel residual noise image 193, each channel of the multi-channel residual noise image corresponding to one or more channels of the multi-channel image, or a single-channel residual noise image 193 (representing the predicted noise level across the channels).

Values of the residual noise image 193 are then weighted using one or more predetermined weighting factors to generate a weighted residual noise image 194. The predetermined weighting factors thereby effectively scale or weight each value of the residual noise image.

In some examples, the one or more predetermined weighting factors may be a single predetermined weighting factor (e.g. a single scalar value a), which is applied to all values of the residual noise image 193.

In other examples, each of a set of one or more values (e.g. each value) of the residual noise image may be associated with a specific/particular predetermined weighting factor which are able to differ with respect to one another.

For instance, each predetermined weighting factor may be dependent upon a spatial position of the value (of the residual noise image) with which that predetermined weighting factor is associated.

In particular, if each value of the residual noise image represents a noise content of a (different) set of one or more pixels, the one or more predetermined weighting factors may comprise a predetermined weighting factor for each value of the residual noise image and which is dependent upon the spatial position of the set of one or more pixels of the image represented by the value of the residual noise image.

For example, if the residual noise image 193 is a single channel two-dimensional image, then the one or more predetermined weighting factors may be represented by a two-dimensional matrix/vector $\alpha(x,y)$ which provides a (potentially different) predetermined weighting for each value of the residual noise image 193.

As another example, if the residual noise image 193 is a single channel three-dimensional image, then the one or more predetermined weighting factors may be represented by a three-dimensional matrix vector $\alpha(x,y,z)$ which provides a (potentially different) predetermined weighting for each value of the residual noise image 193.

In some examples, each predetermined weighting factor may be dependent upon a channel associated with the value (of the residual noise image) with which that predetermined weighting factor is associated.

For example, if the residual noise image 193 is a multi-channel two-dimensional image, then the one or more predetermined weighting factors may be represented by a three-dimensional matrix/vector $\alpha(x,y,c)$ which provides a (potentially different) predetermined weighting for each value of the residual noise image 193.

Similarly, if the residual noise image 193 is a multi-channel three-dimensional image then the one or more predetermined weighting factors may be represented by a four-dimensional matrix/vector $\alpha(x,y,z,c)$ which provides a (potentially different) predetermined weighting for each value of the residual noise image 193 across different channels.

The image 190 and the weighted residual noise image 194 are then combined in a combination process 120 to produce a partially denoised image 195. The partially denoised image is "partially denoised", as the predetermined weighting factor(s) modify the denoising effect that would otherwise result from the combination of the image 190 and the (unweighted) residual noise image 193.

In some examples, the combination process 120 may comprise weighting (i.e. scaling or adjusting) values of the original image 190. The weighting of the original image 190 may be based on the predetermined weighting factor(s) used for weighting the residual image 193, or based on a separate (i.e. second) set of one or more predetermined weighting factors.

If used, this separate set of one or more predetermined weighting factors may be defined in a similar/identical manner to the predetermined weighting factor(s) used for weighting the residual noise image. For instance, the separate set may contain only a single predetermined weighting factor (used to weight all values of the image) or a set of predetermined weight factors (for weighting different sets of one or more values of the image).

As one example of weighting the (original) image based on the one or more predetermined weighting factors (used to weight the residual noise image), the image x may be weighted by a factor of $(1-\alpha)$, where a represents the one or more predetermined weighting factors, e.g. in vector/matrix form, and 1 represents a unit vector/matrix having the same dimensions as $\alpha$.

In any hereafter described combination process, reference to the "image" may be replaced, where appropriate, by a "weighted image", being the output of a weighting process performed on the image 190.

The combination process 120 may comprise, for example, subtracting the values of the weighted residual noise image 194 from the image 190.

For instance, if each value of the residual noise image 193 (and therefore of the weighted residual noise image 194) is associated with a respective pixel of the image 190 (which has only a single channel), then the process 120 may simply comprise, for each value of the weighted residual noise image 194, subtracting the value from the associated pixel of the image 190.

As another example, if each value of the residual noise image 193 (and therefore of the weighted residual noise image 194) is associated with a group of pixels of the image 190 (which has as single channel), then the process 120 may comprise, for each value of the weighted residual noise image, subtracting that value from each pixel in the associated group of pixels of the image 190.

Put algorithmically, where 2 represents the image 190, $\hat{x}_m$ represents the partially denoised image 195, a represents the one or more predetermined weighting factors and r represents the residual noise image:

$$\hat{x}_m = \hat{x} - \alpha \cdot r \tag{1}$$

where:

$$r = f(x) \tag{2}$$

where $f(\cdot)$ represents the process of applying a convolutional neural network to an input.

At a pixel level, where p represents a (value of a) pixel of the image $\hat{x}$, $p_m$ represents a (value of a) pixel of the partially denoised image $\hat{x}_m$, x represents a position of the pixel in an image within an x-direction, y represents the position of the pixel in an image within a y-direction, c represents a channel of the image, $\alpha_p$ represents a predetermined weighting factor for a pixel and $r_p$ represents a (value of the) pixel of the residual noise image, then:

$$\hat{p}_m(x,y,c) = \hat{p}(x,y,c) - \alpha_p(x,y,c) \cdot r_p(x,y,c) \tag{3}$$

If the image comprises only a single channel, then "c" can be omitted in equation (3).

Equation (3) operates on the assumption that there is a predetermined weighting factor (and associated value of the residual noise image) for each pixel of the image $\hat{x}$. However, it may be modified appropriately if each predetermined weighting factor (and associated value of the residual noise image) is shared amongst a group of pixels of the image and/or all pixels of the image.

Equation (3) also operates on the assumption that each image is a two-dimensional image. The term "x,y,c" used in equation (3) may be replaced by the term "x,y,z,c" where appropriate (for multi-channel 3D images) or by "x,y,z" (for single channel 3D images).

In some examples, each one or more predetermined weighting factors comprise a value less than 1.

The workflow process 100 may be applied to each image 190 of a sequence (or series) of images 191 (e.g. images forming a video or (cine)loop). In some examples, the one or more predetermined weighting factors may be dependent upon time and/or a position of the image within the sequence of images.

In other words, the one or more predetermined weighting factors may be dependent upon the (relative) time at which the image 190 was captured and/or a position of the image within a sequence of images. A relative time may, for instance, be a time since a previous image in the sequence of images was captured. As another example, a relative time may be a time since the first image in the image sequence was captured.

Thus, if each image in a sequence of images is a single channel, two-dimensional image, then the one or more predetermined weighting factors may comprise a three-dimensional matrix/vector $\alpha(x,y,t)$. This provides a (potentially different) predetermined weighting factor for each value of the residual noise images generated for the sequence of images.

As another example, if each image in a sequence of images is a single channel, three-dimensional image, then the one or more predetermined weighting factors may comprise a four-dimensional matrix/vector $\alpha(x,y,z,t)$.

As another example, if each image in a sequence of images is a multi-channel, three-dimensional image, then the one or more predetermined weighting factors may comprise a five-dimensional matrix/vector $\alpha(x,y,z,c,t)$.

The skilled person would appreciate how equation (3) could be appropriately updated to incorporate time-based information in the calculation of the partially denoised image. For instance, the term "x,y,c" used in equation (3) may be replaced by the term "x,y,t" (for single channel, 2D images of an image sequence), by the term "x,y,z,t" (for single channel, 3D images of an image sequence) or by the term "x,y,z,c,t" (for multi-channel, 3D images of an image sequence).

Of course, in other examples, the same one or more predetermined weighting factors are applied to the residual noise image for each image in the sequence of images.

From the foregoing, it will be apparent that a predetermined weighting factor (for a particular value of a particular pixel of a residual noise image) may differ depending upon: the spatial position of the pixel within the residual noise image; the channel of the particular value of the particular pixel; and/or the (relative) time and/or position of the image (from which the residual noise image was generated) within a sequence of images.

Thus, a predetermined weighting factor may vary spatially, temporally and/or by channel.

Figure 2:
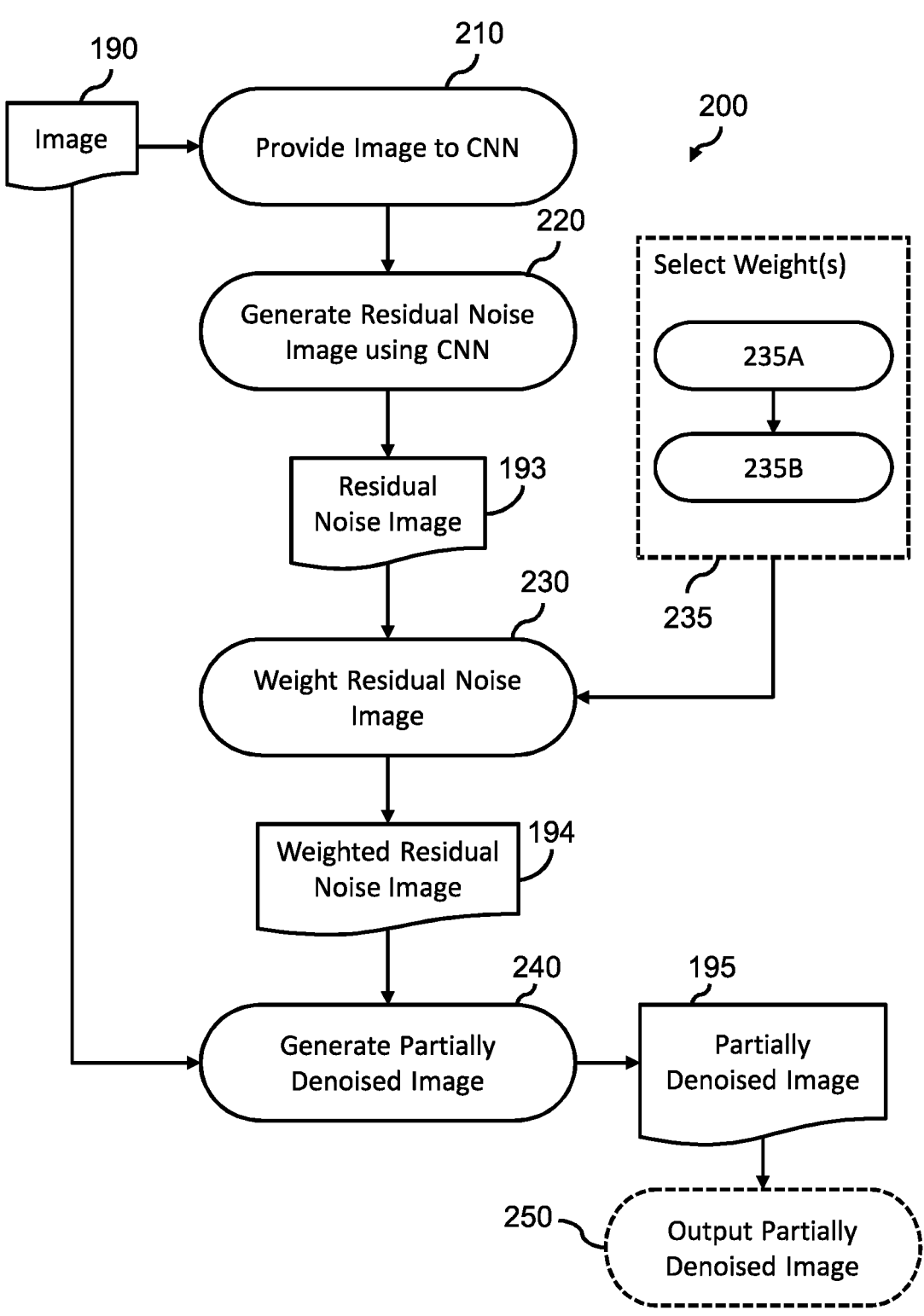
FIG. 2 illustrates a method.

FIG. 2 illustrates a flowchart for a method 200 according to an embodiment. The method 200, when executed, performs the workflow process 100 previously described. The method is a computer-implemented method for generating a partially denoised image 195.

The method 200 comprises a step 210 of providing an image 190 to an input of a convolutional neural network.

The method 200 then performs a step 220 of processing the image using the convolutional neural network to generate a residual noise image 193 representing the noise content of the image.

The method 200 then performs a step 230 of weighting the values of the residual noise image with one or more predetermined weighting factors to generate a weighted residual noise image 194.

The method then performs a step 240 of combining the image and the weighted residual noise image to thereby generate a partially denoised image. Approaches for combining an image and a weighted residual noise image have been previously described.

It has also previously been explained how combining the image and the weighting residual noise image may comprise weighting values of the image. Thus, step 240 may comprise weighting or modifying the values of the image 190 based on the one or more predetermined weighting factors (used in step 230) or based on a separate set of one or more predetermined weighting factors.

Any previously described mechanism can be employed where appropriate in method 200. For instance, the method 200 may be applied to each of a plurality of images forming a sequence of images (e.g. a video or a (cine)loop).

The method 200 may comprise a step 250 of outputting (e.g. displaying), at a user interface, at least the partially denoised image. Step 250 may further comprise displaying the (original) image, although this is not essential.

Where the image is one of a sequence of images (forming a video), steps 210-240 may be performed on each image in the sequence. Step 250 may then comprise outputting the sequence of images (e.g. displaying a video or cineloop). Of course, it is not essential that the sequence of images be completely processed (in steps 210-240) before the sequence of images begins to be displayed/output.

It has previously been described how predetermined weighting factors are used to weight/scale a residual noise image. Mechanisms for determining appropriate predetermined weight factors are hereafter described.

In some examples, the method may comprise a step 235 of selecting or determining the one or more predetermined weighting factors.

Step 235 can be performed by determining the noise level of the image, and determining the noise level of residual noise image, e.g. in a sub-step 235A. Knowing these two noise levels and therewith the noise ratio, the predetermined weighting factors can be selected/determined to achieve a desired noise level for the partially denoised image, e.g. in a sub-step 235B.

The one or more predetermined weighting factors are determined by selecting one or more weighting factors such that the values of one or more noise characteristics of the partially denoised image are responsive to (e.g. match or are proportional to) the values of the same one or more noise characteristics of (a portion of) a reference image. The one or more noise characteristics may comprise, for example, a signal to noise ratio, a contrast-to-noise ratio; a mean, a standard deviation; and an estimated uncertainty map (for an image).

The one or more noise characteristics may include, for example, a signal-to-noise ratio, a mean and/or a standard deviation of a portion of the reference image. The reference image may be provided by a user, e.g. indicating their preference using a user interface or the like. In other examples, the reference image may be dependent upon a context of the image.

For instance, if the image is a medical image that represents a particular area of the body, the reference image may be an example of another medical image representing the same area of the body. In another example, if the image is a low dose medical image or an image having a low exposure time (which are typically very noisy), the reference image may be an example of a high dose medical image or an image having a high exposure time (which are typically less noisy).

In some examples, step 230 is modified to comprise weighting the values of the residual noise image with one or more predetermined weighting factors and one or more further predetermined weighting factors to generate the weighted residual noise image 194.

The one or more further predetermined weighting factors can be selected in response to a user input, e.g. received at a user interface. In this way, the amount of denoising performed on the (original) image can thereby be partially controlled by the user, e.g. to define how close to or how distant from the noise characteristics of a reference image are the noise characteristics of the denoised image. This can be performed by the user selecting one of a plurality of sets of one or more further predetermined weighting factors (e.g. representing different levels of denoising) or through a user defining the further predetermined weighting factor(s) themselves or by continuously adjusting the weighting factors allowing for a continuous noise tuning by the user.

The one or more further predetermined weighting factors may effectively change a proportional relationship between the noise characteristics of the denoised image and the noise characteristics of the reference image.

The proposed mechanism is particularly advantageous for processing medical images, examples of which have been previously described.

Figure 3:
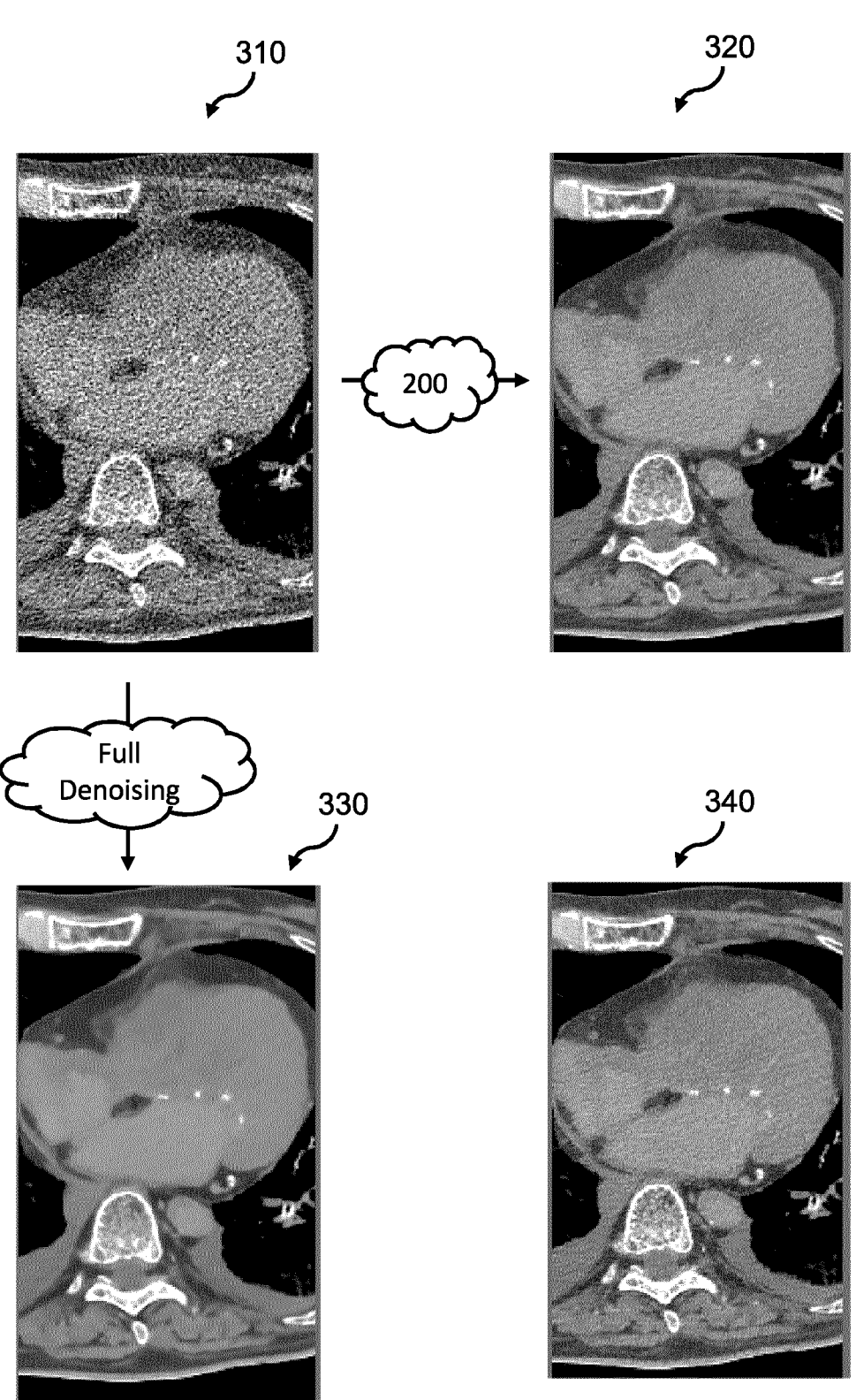
FIG. 3 provides illustrative medical images undergoing the proposed workflow process.

FIG. 3 illustrates the effect of the proposed approach for denoising a medical image 310. The medical image 310 is here a low-dose computed tomography image of a region of a patient, e.g. taken at a 10% (of the maximum possible) dose.

FIG. 3 illustrates a partially denoised image 320, which has been generated by using the approach proposed by the present disclosure, e.g. by performing method 200 on the image 310. FIG. 3 also illustrates, for the sake of comparison, a fully denoised image 330 (which has undergone a full denoising process, in which no weighting/scaling is applied to the residual noise image).

For the sake of comparison, a reference high-dose (or "full-dose") computed tomography image 340 of the same region of the patient is also illustrated. This represents the "ground truth" reference image. This image can act as a reference image for selecting the predetermined weighting factor(s) (as previously described). The predetermined weighting factor(s) are selected so that the values of one or more noise characteristics of the partially denoised image are responsive to (e.g. match or are proportional to) the values of the same one or more noise characteristics of a portion of a reference image, e.g. the entire reference image or only part of the reference image. Here the portion of the reference image is the entire reference image.

From FIG. 3, it can be seen that the fully denoised image 330 has less apparent noise that the reference high-dose image 340. This is an effect of regression-to-mean behavior, which can cause a loss of potentially valuable image information and diagnostic confidence for the image reader.

However, the partially denoised image, which is designed so that the noise level of the partially denoised image matches that of the portion of the reference image 340, means that there is no loss of this potentially valuable data, and the partially denoised image more closely matches the "ground truth" image.

Figure 4:
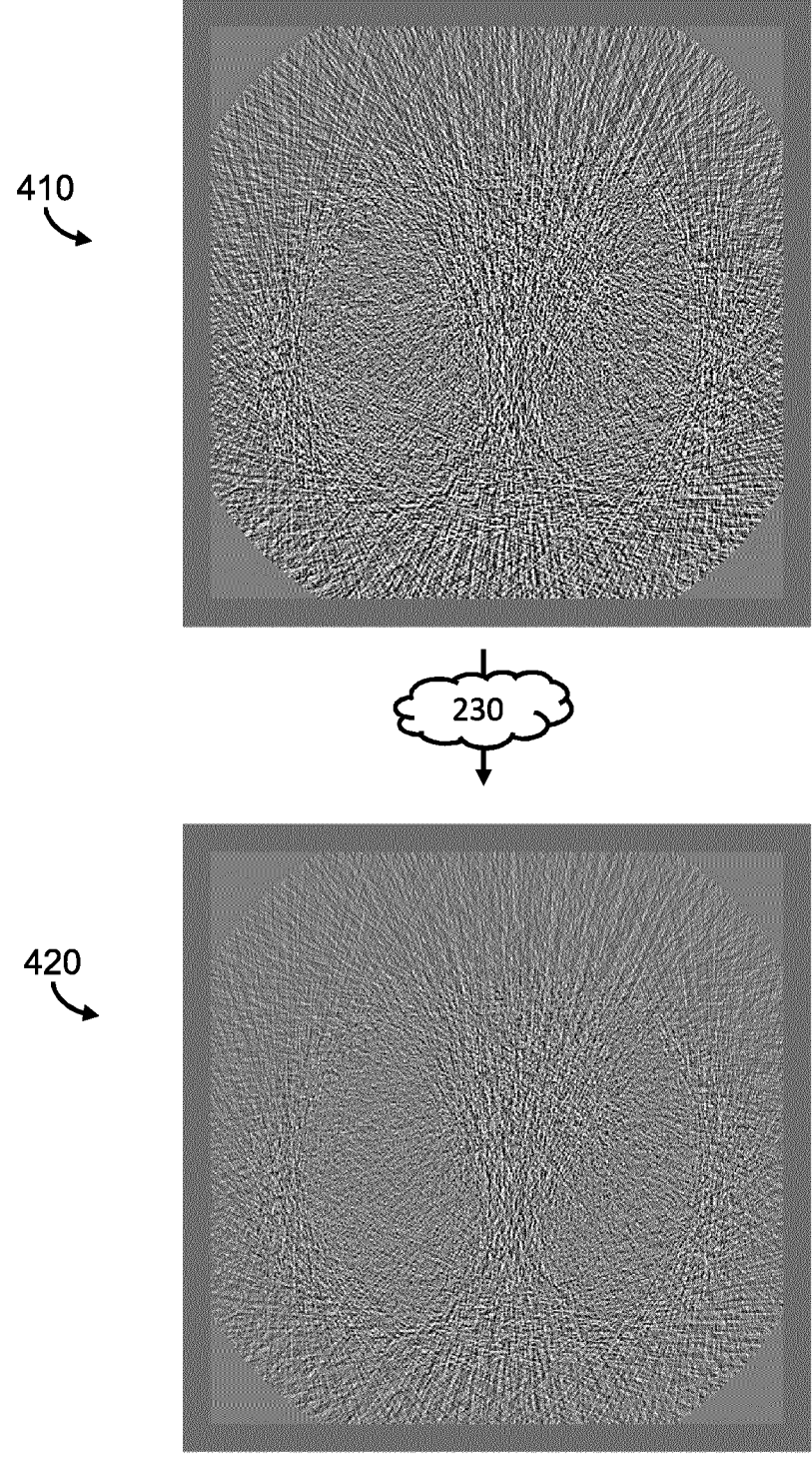
FIG. 4 illustrates an example residual noise image and a weighted residual noise image.

FIG. 4 illustrates the effect of weighting a residual noise image 410. FIG. 4 illustrates an example of a residual noise image, which is here an example of a 2D axial slice from a 3D volume of CT data.

The residual noise image 410 is weighted using the one or more predetermined weight factors, via process 230, to generate a weighted residual noise image 420. As illustrated, this has the effect of modifying the values of the pixels of the weighted residual noise image. This has the effect of reducing the effect of the denoising algorithm when the (original) image is combined with the weighted residual noise image 420, compared to if the (original) image were to be combined with the (unweighted) residual noise image 410.

The proposed mechanism can be used for all types of denoising applications, such as spectral CT denoising. It is of particular use for processing low-dose CT images. However, the application of the proposed approach to other imaging modalities such as PET, MRI or ultrasound (US) is straightforward.

The proposed mechanism can provide a partially denoised image that more closely resembles natural noise textures and can avoid the loss of potentially valuable information (e.g. due to a regression to mean effect). Embodiments can also provide a user with the option to interactively tune the denoising strength to meet individual or task specific demands, thereby resulting in a more clinically specific and useful image that can aid a user in performing a medical task, such as diagnosing or treating the patient.

Figure 5:
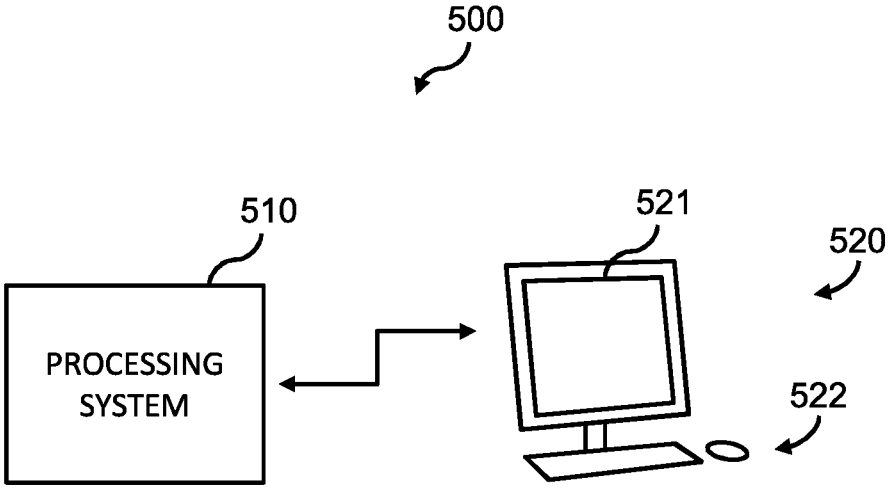
FIG. 5 illustrates a denoising system.

FIG. 5 illustrates a denoising system 500 according to an embodiment.

The denoising system 500 comprises a processing system 510 for generating a partially denoised image. The processing system 510 is itself an embodiment of the invention.

The processing system 510 is adapted to: provide an image to an input of a convolutional neural network; process the image using the convolutional neural network to generate a residual noise image representing the noise content of the image; weight the values of the residual noise image with one or more predetermined weighting factors to generate a weighted residual noise image; and combine the image and the weighted residual noise image to thereby generate a partially denoised image.

The one or more predetermined weighting factors are determined by selecting one or more weighting factors such that the values of one or more noise characteristics of the partially denoised image are responsive to (e.g. match or are proportional to) the values of the same one or more noise characteristics of a portion of a reference image.

The denoising system 500 further comprises a user interface 520. The user interface 520 may comprise a display portion 521 configured to display the partially denoised image.

Of course, if the image (which is processed to generate the partially denoised image) is one of a sequence of images, e.g. a video or cineloop, then the user interface may display the partially denoised video or cineloop.

The user interface 520 may further comprise a user input interface 522, configured to receive input from the user (e.g. usable to define the further predetermined weight factor(s)).

The present disclosure proposes the use of a convolutional neural network to generate a residual noise image by processing an image. A convolutional neural network is an example of a machine-training algorithm that processes input data in order to produce or predict output data. Here, the input data comprises an image and the output data comprises a residual noise image. Thus, the convolutional neural network may directly output the residual noise image by processing the image.

The structure of an artificial neural network (or, simply, neural network) is inspired by the human brain. Neural networks are comprised of layers, each layer comprising a plurality of neurons. Each neuron comprises a mathematical operation. In particular, each neuron may comprise a different weighted combination of a single type of transformation (e.g. the same type of transformation, sigmoid etc. but with different weightings). In the process of processing input data, the mathematical operation of each neuron is performed on the input data to produce a numerical output, and the outputs of each layer in the neural network are fed into the next layer sequentially. The final layer provides the output. Different neural network layers not adjacent to each other may also be connected via short cut or so-called skip connections.

Methods of training a machine-learning algorithm, such as a convolutional neural network, are well known. Typically, such methods comprise obtaining a training dataset, comprising training input data entries and corresponding training output data entries. An initialized machine-learning algorithm is applied to each input data entry to generate predicted output data entries. An error between the predicted output data entries and corresponding training output data entries is used to modify the machine-learning algorithm. This process can be repeated until the error converges, and the predicted output data entries are sufficiently similar (e.g. ±1%) to the training output data entries. This is commonly known as a supervised learning technique.

For example, where the machine-learning algorithm is formed from a convolutional neural network, (weightings of) the mathematical operation of each neuron may be modified until the error converges. Known methods of modifying a neural network include gradient descent, back-propagation algorithms and so on.

It will be understood that the disclosed methods are computer-implemented methods. As such, there is also proposed a concept of a computer program comprising code means for implementing any described method when said program is run on a processing system.

The skilled person would be readily capable of developing a processor for carrying out any herein described method. Thus, each step of a flow chart may represent a different action performed by a processor, and may be performed by a respective module of the processing processor.

As discussed above, the system makes use of a processor to perform the data processing. The processor can be implemented in numerous ways, with software and/or hardware, to perform the various functions required. The processor typically employs one or more microprocessors that may be programmed using software (e.g. microcode) to perform the required functions. The processor may be implemented as a combination of dedicated hardware to perform some functions and one or more programmed microprocessors and associated circuitry to perform other functions.

Examples of circuitry that may be employed in various embodiments of the present disclosure include, but are not limited to, conventional microprocessors, application specific integrated circuits (ASICs), and field-programmable gate arrays (FPGAs).

In various implementations, the processor may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to". Any reference signs in the claims should not be construed as limiting the scope.

The invention claimed is:

1. A computer-implemented method of generating a partially denoised image, the computer-implemented method comprising:

providing an image to a convolutional neural network;

processing the image using the convolutional neural network to generate a residual noise image representing the noise content of the image;

weighting the values of the residual noise image with one or more predetermined weighting factors to generate a weighted residual noise image; and combining the image and the weighted residual noise image to generate a partially denoised image, wherein the one or more predetermined weighting factors are determined by:

obtaining a reference image;

determining one or more noise characteristics of a portion of the reference image; and selecting one or more predetermined weighting factors such that corresponding noise characteristics of the partially denoised image substantially match the determined one or more noise characteristics of the portion of the reference image.

2. The computer-implemented method of claim 1, wherein the image comprises a medical image comprising at least one of: a computed tomography image, a magnetic resonance image, an X-ray image, an ultrasound image, a positron emission tomography image, and a single-photon emission computed tomography image.

3. The computer-implemented method of claim 1, wherein the convolutional neural network is configured to input the image and output the residual noise image, so that the convolutional neural network directly outputs the residual noise image.

4. The computer-implemented method of claim 1, wherein the one or more noise characteristics include at least one of: a signal-to-noise ratio, a contrast-to-noise ratio, a mean a standard deviation, and an estimated uncertainty map.

5. The computer-implemented method of claim 1, wherein:

weighting the values of the residual noise image with one or more predetermined weighting factors comprises weighting the residual noise image with the one or more predetermined weighting factors and one or more further predetermined weighting factors to generate the weighted residual noise image; and the one or more further predetermined weighting factors are determined responsive to a user input.

6. The computer-implemented method of claim 5, wherein the user input comprises a user selection of one or more potential predetermined weighting factors.

7. The computer-implemented method of claim 1, wherein the image is a low-dose computed tomography image.

8. The computer-implemented method of claim 1, wherein:

each value of the residual noise image represents a noise content of a set of one or more pixels of the image, wherein each value represents a different set of one or more pixels; and the one or more predetermined weighting factors comprise a predetermined weighting factor for each value of the residual noise image, which is dependent upon the spatial position of the set of one or more pixels of the image represented by the value of the residual noise image.

9. The computer-implemented method of claim 1, wherein the one or more predetermined weighting factors are dependent upon the time or relative time at which the image was captured and/or a position of the image within a sequence of images.

10. A processing system for generating a partially denoised image, the processing system comprising:

a memory that stores a plurality of instructions; and a processor coupled to the memory and configured to execute the plurality of instructions to:

provide an image to a convolutional neural network;

process the image using the convolutional neural network to generate a residual noise image representing the noise content of the image;

weight the values of the residual noise image with one or more predetermined weighting factors to generate a weighted residual noise image; and combine the image and the weighted residual noise image to generate a partially denoised image, wherein the one or more predetermined weighting factors are determined by:

obtaining a reference image;

determining one or more noise characteristics of a portion of the reference image; and selecting one or more predetermined weighting factors such that corresponding noise characteristics of the partially denoised image substantially match the determined one or more noise characteristics of the portion of the reference image.

11. The processing system of claim 10, wherein the image comprises a medical image comprising at least one of: a computed tomography image, a magnetic resonance image, an X-ray image, an ultrasound image, a positron emission tomography image, and a single-photon emission computed tomography image.

12. The processing system of claim 10, wherein the convolutional neural network is configured to input the image and output the residual noise image, so that the convolutional neural network directly outputs the residual noise image.

13. The processing system of claim 10, further configured to weight the values of the residual noise image with one or more predetermined weighting factors by performing a process comprising weighting the residual noise image with the one or more predetermined weighting factors and one or more further predetermined weighting factors to generate the weighted residual noise image; and the one or more further predetermined weighting factors are determined responsive to a user input.

14. A non-transitory computer-readable medium for storing executable instructions, which cause a method to be performed to generate a partially denoised image, the method comprising:

providing an image to a convolutional neural network;

processing the image using the convolutional neural network to generate a residual noise image representing the noise content of the image;

weighting the values of the residual noise image with one or more predetermined weighting factors to generate a weighted residual noise image; and combining the image and the weighted residual noise image to generate a partially denoised image, wherein the one or more predetermined weighting factors are determined by:

obtaining a reference image;

determining one or more noise characteristics of a portion of the reference image; and selecting one or more predetermined weighting factors such that corresponding noise characteristics of the partially denoised image substantially match the determined one or more noise characteristics of the portion of the reference image.

* * * * *